Dec. 16, 1930. J. W. MacCLATCHIE 1,785,278
VALVE
Filed July 6, 1927
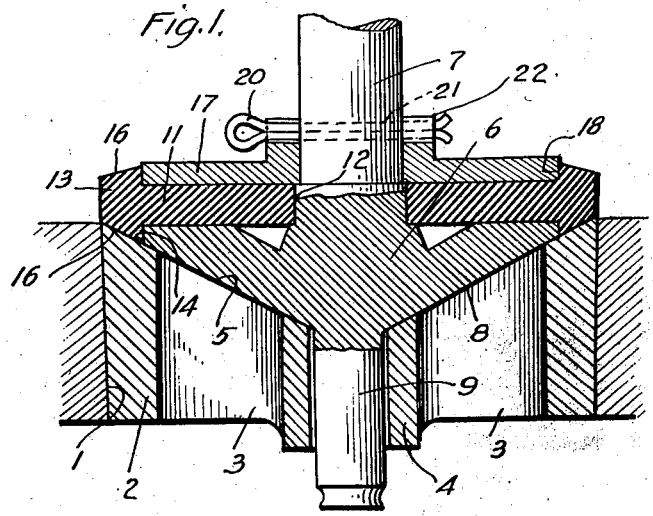
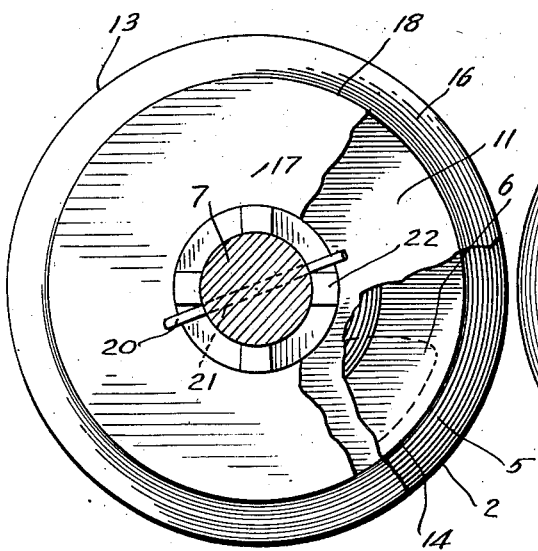
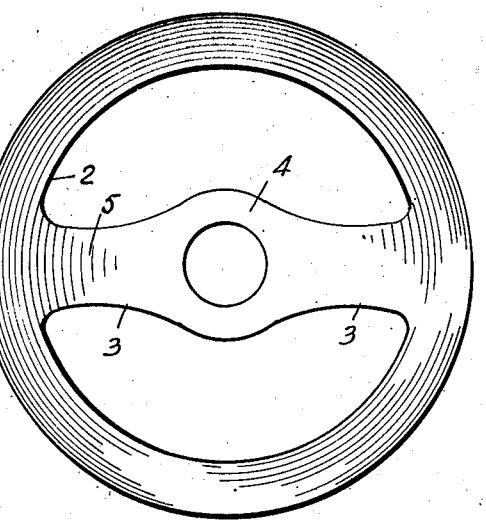
INVENTOR.
John W. MacClatchie
BY
ATTORNEY.

Patented Dec. 16, 1930

1,785,278

UNITED STATES PATENT OFFICE

JOHN W. MacCLATCHIE, OF COMPTON, CALIFORNIA

VALVE

Application filed July 6, 1927. Serial No. 203,780.

This invention relates to valves such as are used in pumps and the like, the specific embodiment of the invention illustrated being a poppet valve particularly adapted for use in a slush pump although the invention is of general adaptability for valve constructions.

It is an object of the invention to provide durable, wear-resisting portions of the cooperating seating surfaces of the valve proper and its seat so arranged as to provide maximum wearing surface, and to provide packing at the cooperating seating surfaces for tightly seating the valve but presenting a relatively small wearing surface so as to relieve the packing of practically all of the load and thereby materially prolong its life while still insuring a tight closure.

It is a further object of the invention to provide a reversable packing which when one seating surface has become worn may be turned over to present its opposite surface for engagement with the valve seat, thereby assuring a tight packing at appreciable reduction in renewal cost.

It is a still further object of the invention to so mount the reversable packing as to permit it being readily turned over and fixed to the valve by use of extremely simplified retaining means adapted to hold the packing in place without the possibility of it flapping; and the invention also contemplates arrangement of the cooperating seating surfaces of the valve proper and its seat so as to provide a tapering engagement adapted to automatically take-up wear and thus insure tight seating of the valve at all times.

Further objects of the invention will be readily understood from the following description of the accompanying drawings showing a preferred embodiment of the invention. In the drawings:

Fig. 1 is an axial section through the valve structure.

Fig. 2 is a plan view of the valve, partly broken away.

Fig. 3 is a plan view of the valve seat.

The seat for the valve may be mounted in a usual exhaust or intake port in the valve chest of a pump structure, the bore of the port preferably tapering slightly as shown at 1 so that the valve seat may be securely fixed therein.

The valve seat is of suitable wear-resisting material and is adapted to provide maximum wearing surface for seating engagement by a cooperating wear-resisting portion of the valve proper. For this purpose the valve seat may comprise an annulus 2 adapted for reception in bore 1 and formed with ribs 3 preferably integral therewith throughout its length and extending toward the center of the annulus where they preferably terminate in an axial guide bearing 4. The ribs are suitably circumferentially spaced to permit passage of a fluid through the bore of the valve seat and therefore preferably comprise simply one pair of ribs in diametrical alinement as shown in Fig. 3. The entire upper end of the valve seat including annulus 2, ribs 3 and guide bearing 4 forms a seating surface 5 for the valve proper, and this seating surface preferably tapers downwardly uniformly from the outer periphery of annulus 2 to the inner periphery of guide bearing 4 as shown in Fig. 1.

The valve proper which cooperates with seating surface 5 is adapted to provide maximum engagement by a wear-resisting surface and minimum engagement by a packing means so that the valve is tightly seated by the packing without the latter being subjected to appreciable wear. For this purpose the valve proper may include an inverted frusto-conical body 6 depending from a valve stem 7, the body being of suitable wear-resisting material and forming a tapering seating surface 8 adapted to engage the seating surface 5. The valve body is preferably provided with a depending axial guide rod 9 adapted for sliding reception in guide bearing 4, and the periphery of the base of the conical body overlies the annulus 2 so that the seating surface 8 engages the seating surface 5 at bearing 4 and along ribs 3 and the inner portion of annulus 2 in order to provide maximum seating engagement.

The means for forming a packing engagement between the valve proper and its seat is radially beyond the seating surface 8 which is shown as terminating short of the outer periphery of annulus 2, and the packing provides a yieldable seating engagement with the outer peripheral portion of the valve seat so as to make a tight closure while relieving the packing of the major portion of the wear.

The packing may be of suitable yieldable material such as rubber, and comprises a disc 11 having an axial bore 12 adapted for reception over valve stem 7 with the packing disc seating on the base of body 6. The packing disc has a peripheral flange 13 preferably extending axially in both directions from the disc with one end or the other of the flange adapted to engage an annular abutment surface 14 formed by the periphery of body 6, and the flange 13 preferably extends to the outer periphery of annulus 2 with its ends forming tapering seating surfaces 16 so disposed that whichever of said end surfaces is turned toward the valve seat it forms a continuation of seating surface 8 and cooperates therewith for engaging seating surface 5.

The packing may be held in place by means permitting its ready reversal to operatively position either of its seating surfaces 16 with relation to seating surfaces 5 and 8, and for this purpose a washer 17 may be mounted on stem 7 so as to overlie disc 11 with the periphery of the washer forming an annular abutment surface 18 adapted to engage the end of flange 13 which is in inoperative position turned away from the valve seat. The retaining washer may be detachably fixed on the valve stem 7 by any usual means shown as a cotter pin 20 adapted to extend through a transverse bore 21 in the valve stem and engaged by a notched collar 22 of the washer.

The packing is thus rigidly clamped between body 6 and washer 17 with the projecting flange 13 of the packing held against flapping through engagement of its ends by annular abutment surfaces 14 and 18. The packing may be readily reversed so that either of its seating surfaces 16 forms a prolongation of seating surface 8, and the seating surface of the packing which is in operative position provides a packing engagement with the outer peripheral portion of seating surface 5 while the seating surface 8 provides a wear-resisting engagement with the entire remaining area of the seating surface of the valve seat. The valve is thus made tight by the cooperating seating surfaces 5—16 but the major portion of the load is borne by the cooperating wear-resisting seating surfaces 5—8.

The seating surfaces 8—16 of the valve proper also provide a uniform tapering engagement with seating surface 5 of the valve seat, and as a result of this arrangement wearing of the parts is automatically taken up so that a tight closure may be maintained.

I claim:

1. In a valve the combination of a valve seat comprising an annulus having inwardly extending ribs with the end of the annulus and ribs forming a tapering seating surface, and a valve including a body and packing thereon, the body forming a wear-resisting seating surface, and the packing forming seating surfaces at its opposite faces and adapted for reverse mounting relative to the body for juxtaposing either of said packing seating surfaces and the wear-resisting seating surface so as to form a continuous tapering seating surface of which the packing and wear-resisting portions are adapted for respective engagement with the annular portion and the rib portion of the tapering seating surface of the valve seat.

2. A valve including a body and packing mounted thereon, the body forming an inclined seating surface and terminating short of the outer periphery of the valve seat with the periphery of the body forming an annular abutment surface, and the packing comprising a disc adapted for mounting on the body and having a peripheral flange extending axially in both directions and forming inclined end seating surfaces, said packing disc being adapted for reverse mounting on the body so as to engage one or the other of the end portions of the packing flange by the annular abutment surface of the body, and the inclined end seating surface of the engaged end portion of the packing flange cooperating with the inclined seating surface of the body to form a tapering seating surface for the valve.

3. A valve including a body and packing mounted thereon, the body forming an inclined seating surface and terminating short of the outer periphery of the valve seat with the periphery of the body forming an annular abutment surface, the packing comprising a disc adapted for mounting on the body, and retaining means adapted to overlie the packing disc and fixed relative to the body, said retaining means forming a peripheral annular abutment surface, and the packing disc having a peripheral flange extending axially in both directions and forming inclined end seating surfaces, said packing disc being adapted for reverse mounting on the body so as to engage one or the other of the end portions of the packing flange by the annular abutment surface of the body and engage the other of the end portions of the packing flange by the annular abutment surface of the retaining means, and the inclined seating surface of the end portion of the packing flange which is engaged by the annular abutment surface of the body cooperating with the inclined seating surface of the body to form a tapering seating surface for the valve.

4. In a valve the combination of a valve seat comprising an annulus having inwardly extending ribs with the end of the annulus and ribs forming a tapering seating surface, and a valve including a body and packing mounted thereon, the body forming a seating surface adapted to overlie the inner peripheral portion of the annulus and the ribs of the valve seat with the periphery of the body forming an annular abutment surface, and the packing comprising a disc adapted for mounting on the body and having an axially projecting peripheral flange adapted for engagement by the annular abutment surface of the body and forming an end seating surface extending to the outer periphery of the annulus of the valve seat, said end seating surface of the packing cooperating with the seating surface of the body to form a tapering seating surface for the valve adapted to engage a tapering seating surface of the valve seat.

5. A valve including a body and packing mounted thereon, the body forming a wear-resisting inclined seating surface, and the packing forming an inclined seating surface at its opposite faces and adapted for reverse mounting relative to the body for juxtaposing either of said inclined packing seating surfaces and the inclined wear-resisting seating surface so as to form a continuous tapering seating surface for the valve.

In testimony whereof he has affixed his signature to this specification.

JOHN W. MacCLATCHIE.